Patented Aug. 15, 1967

3,336,366
2-PROPYNYL ESTERS OF POLYCARBOXYLIC ACIDS
Dale Robert Dill, Webster Groves, Mo., assignor to Monsanto Company, St. Louis, Mo., a corporation of Delaware
No Drawing. Filed Oct. 19, 1964, Ser. No. 404,945
6 Claims. (Cl. 260—475)

This invention relates to a new class of chemical compounds. More particularly, the invention relates to novel 2-propynyl esters of polycarboxylic acids.

The novel 2-propynyl esters are selected from the group consisting of compounds of the formulas,

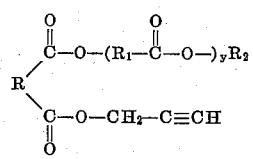

and

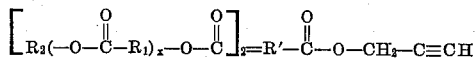

and

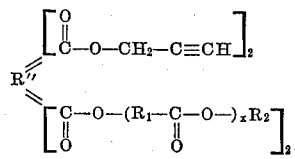

wherein:

R is a member of the group consisting of phenylene, alkyl-substituted phenylene of 7 to 16 carbon atoms, halophenylene, nitrophenylene, cyclohexenylene, naphthylene, ethylene, trimethylene, alkyl-substituted ethylene of 3 to 12 carbon atoms, alkenyl-substituted ethylene of 7 to 14 carbon atoms, vinylene, chlorovinylene, bromovinylene, 1-isopropenylene and 3-isopropenylene;

R' is a member of the group consisting of phenenyl and 1-propen-1,2,3-yl;

R" is benzenetetrayl;

$R_1$ is a divalent aliphatic hydrocarbon radical containing from 1 to 4 carbon atoms;

$R_2$ is a radical selected from the group consisting of alkyl, aralkyl and aryl radicals having 1 to 20 carbon atoms;

$x$ is 0 to 1 and $y$ is 0 to 1, further provided when $y$ is 0, $R_2$ is a radical selected from the group consisting of aralkyl and aryl having from 6 to 20 carbon atoms.

It has been found that the heretofore described 2-propynyl esters of polycarboxylic acids can be readily prepared by heating, in equimolar quantities, a polycarboxylic acid anhydride, 2-propyn-1-ol, a tertiary amine, and an alkyl halide, an aralkyl halide or an aliphatic, cycloaliphatic or aryl ester of a lower haloalkanoic acid.

The polycarboxylic acid anhydrides useful in the preparation of the novel compounds of this invention include succinic anhydride, substituted succinic anhydrides such as polysuccinic anhydride, methylbutylsuccinic anhydride, hexylsuccinic anhydride, heptylsuccinic anhydride, tetrapropenylsuccinic anhydride, pentenylsuccinic anhydride, octenylsuccinic anhydride, nonenylsuccinic anhydride, α,β-diethylsuccinic anhydride and the like; glutaric anhydride; maleic anhydride; substituted maleic anhydrides such as chloromaleic anhydride and dichloromaleic anhydride; itaconic anhydride; citraconic anhydride; aconitic anhydride; tetrahydrophthalic anhydride; trimellitic anhydride; pyromellitic anhydride; phthalic anhydride; methylenetetrahydrophthalic anhydride; tetrabromophthalic anhydride; tetraiodophthalic anhydride; substituted phthalic anhydrides such as tetrachlorophthalic anhydride, 4-nitrophthalic anhydride, methylphthalic anhydride, ethylphthalic anhydride, propylphthalic anhydride, butylphthalic anhydride; naphthalic anhydrides such as 1,2-naphthalic anhydride, 1,8-naphthalic anhydride, 2,3-naphthalic anhydride; polymeric dicarboxylic acid anhydrides, or mixed polymeric dicarboxylic acid anhydrides such as those prepared by the autocondensation of dicarboxylic acids; for example, adipic acid, pimelic acid, sebacic acid, hexahydroisophthalic acid, terephthalic acid, isophthalic acid and the like. Also, other dicarboxylic acid anhydrides, useful in the preparation of polymerizable compositions, include the Diels-Alder adducts of maleic acid and aliphatic compounds having conjugated double bonds.

Tertiary amines suitable for use in preparing the compounds of this invention can be represented by the formula,

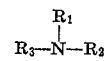

wherein $R_1$, $R_2$ and $R_3$ are like or unlike saturated aliphatic organic radicals. Preferably, $R_1$, $R_2$ and $R_3$ have a total of 3 to 24 carbon atoms, and it is also preferred that $R_1$, $R_2$ and $R_3$ be alkyl radicals. Non-limiting examples of such tertiary amines are trimethylamine, triethylamine, tri-n-propylamine, triisopropylamine, tri-n-butylamine, triisoamylamine, trihexylamine, triethanolamine, methyldiethylamine, dimethylethylamine, methyldiethanolamine, dimethylethanolamine, dimethylcyclohexylamine, dimethylhexylamine, diethylhexylamine, dimethyldecylamine and the like.

The alkyl halide reactant of this invention can be represented by YX, where Y is a straight or branched chain alkyl radical containing up to 20 carbon atoms, and X is a halogen atom such as chlorine, bromine and iodine atoms, with a preference in that order. It is preferred that YX be an alkyl halide containing 4 to 20 carbon atoms.

As illustrative of the preferred alkyl halide reactants of this invention are n-butyl chloride, n-butyl bromide, sec.-butyl chloride, n-amyl chloride, isoamyl chloride, sec.-amyl chloride, sec.-amyl iodide, n-amyl bromide, n-hexyl chloride, isohexyl chloride, sec.-hexyl chloride, 2-chlorohexane, n-heptyl chloride, isoheptyl chloride, 2-chloroheptane, n-octyl chloride, n-octyl bromide, n-octyl iodide, isooctyl chloride, 2-chlorooctane, 4-chlorooctane, 2-ethylhexyl chloride, 2-chlorononane, 3-chlorononane, 2-chlorodecane, n-decyl chloride, 3-chlorodecane, undecyl chloride, 2-chloroundecane, n-dodecyl chloride, n-dodecyl bromide, 2-chlorododecane, 2-bromododecane, 3-chlorododecane, tridecyl chloride, tetradecyl chloride, pentadecylchloride, hexadecyl chloride, octadecyl chloride, octadecyl bromide, eicosyl chloride, and the various isomers thereof and various mixtures thereof, as, for example, those obtained upon monochlorinating alkane fractions obtained from petroleum fractions boiling at atmospheric pressure in the range of about 30° C. to about 300° C., such as a pentane cut from gasoline boiling from about 30° C. to about 40° C., a ligroin boiling from about 90° C. to about 120° C., a benzine boiling from about 120° C. to about 150° C., and a kerosene boiling from about 150° C. to about 235° C.

The aralkyl halides which can be used in the process of this invention are benzyl chloride, bengyl bromide and benzyl iodide, as well as the alkyl-substituted benzyl halides, e.g., methyl benzyl chloride, methyl benzyl bromide, ethyl benzyl chloride, dimethyl benzyl chloride and the like, the alkoxy-substituted benzyl halides, e.g., methoxy benzyl chloride, ethoxy benzyl chloride, dimethoxy benzyl bromide, and the halogen-substituted benzyl halides, e.g., chlorobenzyl chloride, chlorobenzyl iodide, dichlorobenzyl bromide, dichlorobenzyl chloride, trichlorobenzyl chloride, bromobenzyl chloride, bromobenzyl bromide, dibromobenzyl chloride, iodobenzyl chloride and the like.

Aliphatic, cycloaliphatic and aryl esters of lower haloalkanoic acids which can be used in the process of the invention can be prepared from chloroacetic, iodoacetic, 3-chloropropionic, bromoacetic, 4-chlorobutyric acid and the like.

The invention will be more readily understood by reference to the following examples which describe the detailed preparation of representative compounds. There are, of course, many other forms of this invention which will become obvious to one skilled in the art once the invention has been fully disclosed, and it will accordingly be recognized that these examples are given for the purpose of illustration only, and are not to be construed as limiting the scope of this invention in any way.

*Example 1*

To a suitable reaction vessel having means for the addition and removal of heat, means for measuring the temperature of the reaction mass, means for agitating the reaction mass, means for the addition and removal of solids and liquids, and fitted with a condenser, there are charged 198 grams (1.0 mol) of 1,8-naphthalic anhydride and 59.0 grams (1.05 mols) of 2-propyn-1-ol. The mixture is heated to about 110° C., and 106.0 grams (1.05 mols) of triethylamine are added. There are then added 204.0 grams (1.05 mols) of 1-bromooctane. The resultant reaction mixture is held at a temperature of about 140° C. for about one hour and then washed with several water and aqueous sodium carbonate washes. The oil layer from the washing step is steam sparged and dehydrated under vacuum. There is obtained octyl-2-propynyl 1,8-naphthalate.

*Example 2*

A suitable reaction vessel is charged with 148.1 grams (1.0 mol) of phthalic anhydride and 59.0 grams (1.05 mols) of 2-propyn-1-ol. The reaction mixture is heated to about 110° C. over a period of about one hour. There is then added 106.0 grams (1.05 mols) of triethylamine. Upon completion of the addition of the triethylamine to the mixture, 136.5 grams (1.08 mols) of benzyl chloride are added. The temperature of the reaction mixture is then maintained at about 135° C. for an additional one hour to insure completion of the reaction. The resultant reaction mixture is washed several times with water and aqueous sodium carbonate washes. The reaction mixture is then steam sparged and dehydrated under vacuum at 120–125° C. and 20 mm. Hg. There is obtained 271.0 grams (91% of theory) of benzyl 2-propynyl phthalate.

*Example 3*

A suitable reaction vessel is charged with 100.1 grams (1.0 mol) of succinic anhydride and 60.0 grams (1.07 mols) of 2-propyn-1-ol. The reaction mixture is heated to about 120° C. over a period of about one hour. There is then added 107 grams (1.06 mols) of triethylamine. Upon completion of the addition of the triethylamine to the mixture, 136.5 grams (1.08 mols) of benzyl chloride is added. The temperature of the reaction mixture is then maintained at about 140° C. for an additional two hours to ensure completion of the reaction. The resultant reaction mixture is washed several times with water and lye washes at 90° C. The reaction mixture is then steam sparged and dehydrated under vacuum. An excellent yield of benzyl 2-propynyl succinate is obtained.

*Example 4*

Following the procedure of Example 2, 112.0 grams (1.0 mol) of itaconic anhydride, 60 grams (1.07 mols) of 2-propyn-1-ol, 106 grams (1.08 mols) of triethylamine and 138.0 grams (0.98 mol) of methylbenzyl chloride are utilized to prepare methylbenzyl 2-propynyl itaconate in good yield.

*Example 5*

Following the procedure of Example 2, 162.2 grams (1.0 mol) of methyl phthalic anhydride, 60 grams (1.07 mols) of 2-propyn-1-ol, 106 grams (1.05 mols) of triethylamine and 161.0 grams (0.98 mol) of butyl 3-chloropropionate are utilized to prepare 3-(butoxycarbonyl)-propyl 2-propynyl methylphthalate in good yield.

*Example 6*

A suitable reaction vessel is charged with 148.1 grams (1.0 mol) of phthalic anhydride and 60 grams (1.07 mols) of 2-propyn-1-ol. The mixture is heated to a temperature of about 115° C. There is then added 106.5 grams (1.05 mols) of triethylamine. After the addition of the triethylamine is complete, 223.0 grams (1.08 mols) of 2-ethylhexyl α-chloroacetate is added to the reaction mixture. The resulting mixture is held at a temperature of about 140° C. for about three hours and then washed with several lye and water washes at about 70° C. The reaction mixture is steam sparged and dehydrated under vacuum. There is obtained (2-ethylhexoxycarbonyl)methylene 2-propynyl phthalate.

*Example 7*

Following the procedure of Example 6, 156.1 grams (1.0 mol) of aconitic anhydride, 60 grams (1.07 mols) of 2-propyn-1-ol, 212.0 grams (2.10 mols) of triethylamine and 248.0 grams (1.96 mols) of benzyl chloride are utilized to prepare dibenzyl 2-propynyl aconitate in good yield.

*Example 8*

In the procedure of Example 6, 167.0 grams (0.98 mol) of phenyl α-chloroacetate are substituted for the 2-ethylhexyl α-chloroacetate. There is obtained phenoxycarbonyl methylene 2-propynyl phthalate in good yield.

*Example 9*

A suitable reaction vessel is charged with 98.1 grams (1.0 mol) of maleic anhydride, 60 grams (1.07 mols) of 2-propyn-1-ol and 2 ml. of thionyl chloride. After the mixture has been allowed to react for about one hour, 106 grams (1.05 mols) of triethylamine and 124 grams (0.98 mol) of benzyl chloride are added. The reaction mixture is worked up in the manner described above, and there is obtained benzyl 2-propynyl fumarate in high yield.

*Example 10*

Following the procedure of Example 6, 152.2 grams (1.0 mol) of tetrahydrophthalic anhydride, 60 grams (1.07 mols) of 2-propyn-1-ol, 106 grams (1.05 mols) of triethylamine and 153.5 grams (0.98 mol) of methoxybenzyl chloride are utilized to prepare methoxybenzyl 2-propynyl tetrahydrophthalate.

*Example 11*

Following the procedure of Example 2, 192.1 grams (1.0 mol) of trimellitic anhydride, 60 grams (1.07 mols) of 2-propyn-1-ol, 212.0 grams (2.10 mols) of triethylamine and 248 grams (1.96 mols) of benzyl chloride are utilized to prepare dibenzyl 2-propynyl trimellitate in excellent yield.

*Example 12*

Following the procedure of Example 2, 218.1 grams (1.0 mol) of pyromellitic anhydride, 118 grams (2.1 mols) of 2-propyn-1-ol, 212 grams (2.10 mols) of triethylamine and 248 grams (1.96 mols) of benzyl chloride are utilized to prepare dibenzyl 2-propynyl pyromellitate in good yield.

The 2-propynyl esters of polycarboxylic acids are valuable as plasticizers for various resins, such as polyvinyl chloride, polyvinyl acetate and cellulose derivatives. These esters are also useful as a comonomer with other polymerizable materials, such as vinyl esters, acrylic or methacrylic esters, styrene, vinyl chloride and the like.

While this invention has been described with respect to certain embodiments, it is not so limited, and it is to be understood that variations and modifications thereof may be made without departing from the spirit or scope of the invention.

The embodiments of the invention in which an exclusive property or privilege is claimed are defined as follows:

1. A compound selected from the group consisting of those having the formulas,

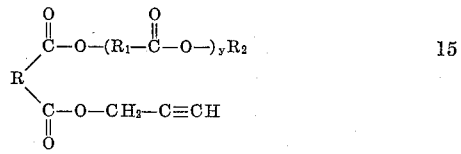

and

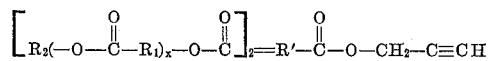

and

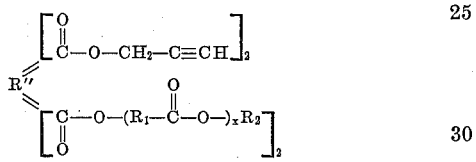

wherein:
R is a member of the group consisting of phenylene, alkyl-substituted phenylene of 7 to 16 carbon atoms, halo-phenylene, nitrophenylene, cyclohexenylene, naphthylene, ethylene, trimethylene, alkyl-substituted ethylene of 3 to 12 carbon atoms, alkenyl-substituted ethylene of 7 to 14 carbon atoms, vinylene, chlorovinylene, bromovinylene, 1-isopropenylene and 3-isopropenylene;
R' is a member of the group consisting of phenenyl and 1-propen-1,2,3-yl;
R'' is benzenetetrayl;
$R_1$ is alkylene of 1 to 4 carbon atoms;
$R_2$ is a radical selected from the group consisting of alkyl of 1 to 20 carbon atoms, phenyl, benzyl and alkyl-substituted benzyl of 8 to 11 carbon atoms;
$x$ is an integer from 0 to 1, and $y$ is an integer of 0 to 1, further provided when $y$ is 0, $R_2$ is a radical selected from the group consisting of phenyl, benzyl and alkyl substituted benzyl of 8 to 11 carbon atoms.

2. A compound of the formula,

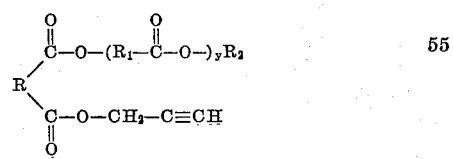

wherein:
R is a member of the group consisting of phenylene, alkyl-substituted phenylene of 7 to 16 carbon atoms, halophenylene, nitrophenylene, cyclohexenylene, naphthylene, ethylene, trimethylene, alkyl-substituted ethylene of 3 to 12 carbon atoms, alkenyl-substituted ethylene of 7 to 14 carbon atoms, vinylene, chlorovinylene, bromovinylene, 1-isopropenylene and 3-isopropenylene;
$R_1$ is alkylene of 1 to 4 carbon atoms;
$R_2$ is a radical selected from the group consisting of alkyl of 1 to 20 carbon atoms, phenyl, benzyl and alkyl-substituted benzyl of 8 to 11 carbon atoms; and
$y$ is an integer from 0 to 1 further provided when $y$ is 0, $R_2$ is a radical selected from the group consisting of phenyl, benzyl and alkyl substituted benzyl of 8 to 11 carbon atoms.

3. A compound of the formula,

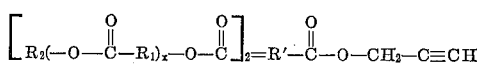

wherein:
R' is a member of the group consisting of phenenyl and 1 propen-1,2,3-yl;
$R_1$ is alkylene of 1 to 4 carbon atoms;
$R_2$ is a radical selected from the group consisting of alkyl of 1 to 20 carbon atoms, phenyl, benzyl and alkyl-substituted benzyl of 8 to 11 carbon atoms; and
$x$ is an integer from 0 to 1.

4. A compound of the formula,

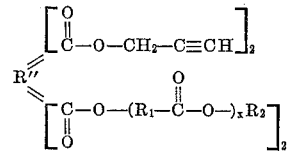

wherein:
R'' is benzenetetrayl;
$R_1$ is alkylene of 1 to 4 carbon atoms;
$R_2$ is a radical selected from the group consisting of alkyl of 1 to 20 carbon atoms, phenyl, benzyl and alkyl substituted benzyl of 8 to 11 carbon atoms; and
$x$ is an integer from 0 to 1.

5. Benzyl 2-propynyl succinate.

6. (2 - ethylhexoxycarbonyl)methylene 2 - propynyl phthalate.

References Cited

UNITED STATES PATENTS 2,275,467    3/1942    Pollack et al. _____ 260—475

RICHARD K. JACKSON, *Primary Examiner.*

T. L. GALLOWAY, *Assistant Examiner.*